United States Patent [19]

Jonda

[11] 4,025,675

[45] May 24, 1977

[54] REINFORCED LAMINATES

[75] Inventor: Wolfgang Jonda, Oberpframmern, Germany

[73] Assignee: Messerschmitt-Bolkow-Blohm GmbH, Munich, Germany

[22] Filed: Dec. 11, 1974

[21] Appl. No.: 531,750

[30] Foreign Application Priority Data

Dec. 19, 1973  Germany .......... 2363155

[52] U.S. Cl. .......... 428/36; 428/72; 428/116; 428/902
[51] Int. Cl.$^2$ .......... B32B 3/12
[58] Field of Search .......... 161/68, 69, 402; 156/197, 167; 428/73, 105, 112, 113, 116, 119, 910, 36, 72, 902; 52/615, 618

[56] References Cited

UNITED STATES PATENTS

| 1,002,132 | 8/1911 | Brown ............ 161/68 X |
| 2,843,153 | 7/1958 | Young ............ 156/175 X |
| 3,247,039 | 4/1966 | Schultheiss ............ 156/167 |
| 3,291,333 | 12/1966 | House ............ 428/116 X |
| 3,300,354 | 1/1967 | Duft ............ 156/169 |
| 3,490,983 | 1/1970 | Lee ............ 428/113 |
| 3,544,417 | 12/1970 | Corzine ............ 161/50 |
| 3,673,058 | 6/1972 | Jackson et al. ............ 161/68 |
| 3,694,284 | 9/1972 | Kromrey ............ 156/197 X |
| 3,713,959 | 1/1973 | Rottmayer et al. ............ 161/68 X |

FOREIGN PATENTS OR APPLICATIONS

| 2,032,423 | 1/1971 | Germany |
| 1,779,024 | 8/1971 | Germany |
| 619,674 | 3/1949 | United Kingdom |

Primary Examiner—George F. Lesmes
Assistant Examiner—Henry F. Epstein
Attorney, Agent, or Firm—Toren, McGeady and Stanger

[57] ABSTRACT

The disclosed reinforced laminate or composite board comprises external first and second continuous spaced sheets of fiber-reinforced synthetic resin, with the reinforcing fibers in each sheet oriented so as to provide reinforcement in two directions of stress. A supporting core is sandwiched between the first and second sheets. This supporting core is formed by a plurality of rib elements extending in directions different from the directions in which the reinforcing fibers of the first and second sheets are oriented. The rib elements are composed of superimposed roving bundles which are impregnated with synthetic resin. In a preferred embodiment of the invention, the reinforcing fibers of the external sheets are arranged in two superimposed fiber layers, the fibers of one of the layers extending perpendicularly to the fibers of the other layer, thereby to provide reinforcement in two main directions of stress. The rib elements in this embodiment extend diagonally to the fibers of the external sheets.

4 Claims, 4 Drawing Figures

REINFORCED LAMINATES

FIELD OF INVENTION

The invention is directed to composite boards or reinforced laminates of the sandwich type, wherein a supporting core is sandwiched between fiber-reinforced top and bottom layers of synthetic resin.

BACKGROUND INFORMATION AND PRIOR ART

Composite boards composed of a laminate whose outer sheets or plates consist of fiber-reinforced synthetic resins with a supporting core sandwiched therebetween are widely used in the construction industry in place of steel sheets, wood boards and the like.

In such constructions, the supporting core or sandwiched layer is oftentimes constructed as a shear- and thrust-resistant core which sometimes is made, for example, of polyurethane foam, wood, or the like. One of the problems associated with fiber-reinforced synthetic resin layers is that they possess relatively high strength, to wit, strength which is superior to that of metal layers, only in the directions in which the reinforcing fibers are oriented. This, of course, means that for each direction of expected stress or load, correspondingly oriented fiber material has to be provided. From a practical point of view, this is customarily achieved by orienting the fiber material in the direction of the main stresses to be expected. Thus, for example, if the sheet is to be subjected to longitudinal, transverse and torsion stresses or loads, fiber-reinforcement in at least three directions corresponding to these stresses and calculated on a plane stress condition have to be provided. The desired strength and stability which is superior to those of metals, is not accomplished by the provision of a prior art shear- or thrust-resistant core, such as, for example, disclosed in German Offenlegungsschrift No. 1,779,024 in which the core consists of foam or a honeycomb structure.

A different proposal for sandwich structures of the kind with which this invention is concerned is disclosed in German Auslegeschrift No. 2,032,423. According to the teachings of this Auslegeschrift, reinforcing inserts for the fiber-reinforced synthetic resin sheets are proposed. The individual layers or sheets are stitched together by stitching threads which penetrate the individual sheets or layers so that a stitched structure is obtained. This construction is exceedingly cumbersome due to the required stitching procedure and manufacture is expensive. Moreover, the ultimate structure obtained is not shear- and thrust-resistant.

Moreover, the prior art constructions, including those of the German Offenlegungsschrift and the German Auslegeschrift referred to, are relatively heavy, a disadvantage which should be avoided for many fields of application, such as the aircraft and space industry.

SUMMARY OF THE INVENTION

It is a primary object of the invention to overcome the disadvantages of the prior art constructions and to provide a reinforced sandwich laminate of the type discussed which is superior in respect of shear- and thrust-resistance.

It is also an object of the invention to provide a reinforced laminate which is exceedingly simple to manufacture, is light in weight and relatively inexpensive.

Generally, it is an object of the invention to improve on the art of reinforced laminates as presently practised.

Briefly, and in accordance with the invention, a reinforced laminate comprises external first and second continuous spaced sheets of fiber-reinforced synthetic resin, with the reinforcing fibers in each sheet being oriented to provide reinforcement in two directions of stress. A supporting core is sandwiched between the first and second sheets. This supporting core is formed by a plurality of rib elements which extend in directions different from the directions in which the reinforcing fibers of the first and second sheets are oriented. The rib elements are composed of roving bundles which are impregnated and thus reinforced with synthetic resin.

In a preferred embodiment of the invention, the reinforcing fibers of each of the first and second external sheets are arranged in two superimposed fiber layers, with the fibers of one of the layers extending perpendicularly to the fibers of the other layer, thereby to provide reinforcement in the two main directions of stress. The rib elements with their synthetic resin impregnated roving bundles extend then diagonally to the fibers of the first and second sheets.

From a practical point of view, it is advantageous to provide a plurality of roving bundles which are superimposed and impregnated with synthetic resin.

The rib elements may extend in an intersecting or crossing manner to form a net structure.

The fibers for the external layers may consist of fibers generally used for reinforcement purposes, such as glass, carbon, certain metal compounds, boron, and the like.

The same applies substantially for the rovings of the support core. The term rovings is, of course, well known in the art and generally refers to untwisted, linear fibers or filaments which are united together to form a strand. It should be appreciated that the nature of the fiber material, be it in the external layers or the supporting core, does not constitute the invention since such fiber material is well known in the art.

From a practical point of view, the fibers of the external layers are advantageously provided in mat form, the fibers of one mat extending longitudinally relative to the sheet while the fibers of the other mat extend at right angle thereto. The two mats are then superimposed and impregnated with synthetic resin to be embedded by the resin.

As stated, a plurality of roving bundles are preferably superimposed one upon the other and/or juxtaposed and are impregnated with synthetic resin to form the rib elements. The rib elements are thus in fact resin strips with roving bundles contained therein. The general orientation of these rib elements is thus in directions different from the direction of orientation of the fibers in the external sheets so that the sandwiched rib elements provide reinforcement in stress directions which are different from the stress directions for which the reinforcing fibers of the external sheets are provided.

A particular advantage of the present invention is that spaces are provided and left open between the rib elements, thereby significantly reducing the weight of the total structure. Since the rib elements extend in directions different from the directions of the reinforcing fibers of the external layers, the strength of the structure is significantly increased in spite of the open spaces in the sandwiched core.

It will be appreciated that the two main directions of stress are generally the longitudinal and transverse directions relative to the structure. Therefore, the fibers in the top and bottom sheets are oriented in these two directions so that the fibers extend perpendicular to each other. By contrast, the rib elements composed of their resin reinforced roving bundles, extend then diagonally to the fibers of the external sheets.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there are illustrated and described preferred embodiments of the invention.

DESCRIPTION OF THE PREFERRED EMBODIMENTS

Figure 1:
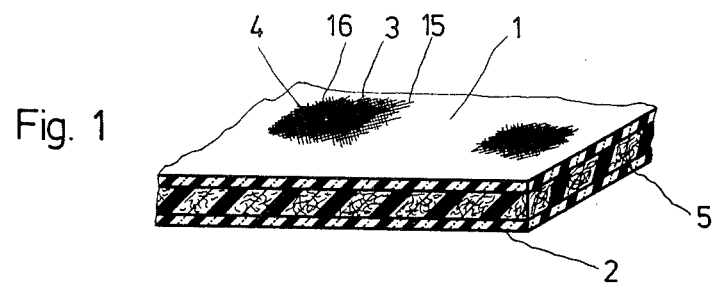
FIG. 1 is a cross-sectional perspective view of one embodiment of reinforced laminate constructed according to the prior art.

Referring now to the drawings and FIG. 1 in particular, it will be noted that the prior art structure there depicted comprises external top and bottom sheets or plates 1 and 2 with a supporting core 5 sandwiched between the plates 1 and 2. Fibers are embedded in the resin structure of the sheets 1 and 2. It will be noted that the fibers indicated by reference numerals 3, 4, 15 and 16 are arranged in crossing or intersecting manner in the directions of the four main directions of stress. Thus, the criss-cross or crosswisely arranged fibers provide reinforcement in four stress directions, the fibers being embedded in a synthetic resin of the type generally used in the art for such purposes. The core 5 of this prior art structure is made of polyurethane foam, the core completely filling the interspace between the outer plates or sheets 1 and 2.

Figure 2:
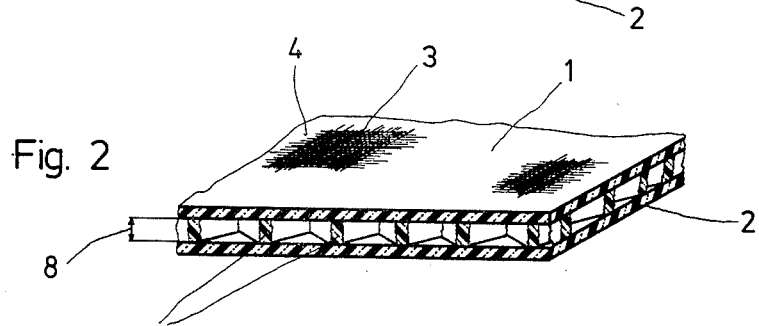
FIG. 2 is a corresponding cross-sectional perspective view of an embodiment of reinforced laminate pursuant to the invention.
Figure 3:
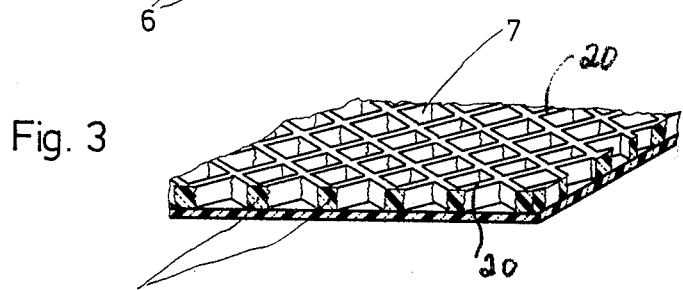
FIG. 3 is a cross-sectional view corresponding to FIG. 2 but with the top sheet having been omitted.

Turning now to the inventive structure of FIGS. 2 and 3, it will be noted that, as in the prior art construction, the structure or composite board comprises outer layers 1 and 2 and a supporting core. Contrary to the prior art construction, the fibers 3 and 4 as seen in the top layer of FIG. 2 extend in two directions of stress only, to wit, longitudinally and transversely. From a practical point of view, the fibers 3 are all arranged in a mat while the fibers 4 are arranged in a different mat, the fibers of the first mat extending perpendicularly to the fibers of the second mat. Of course, it is not necessary to arrange the fibers in mat formation. The same arrangement applies to the fiber orientation of the bottom sheet 2.

The intermediate layer or supporting core in accordance with the invention consists of a plurality of rib elements 20 which, in the embodiment here shown, extend diagonally relative to the orientation of the fibers 3 and 4 in the outer sheets. These rib elements are composed of roving bundles which are superimposed and impregnated with synthetic resin of a suitable composition well known in the art. These roving bundles are indicated by reference numeral 6. The rovings may be made from glass fibers, boron, carbon, or the like, as is well known in the art. It should be noted that spaces 7 remain open between the rib elements 20 which, of course, results in significant reduction of the weight of the total structure while the stability or strength is not impaired. As a matter of fact, the strength characteristics of the structure of FIG. 2 are at least comparable if not superior to those of FIG. 1.

The superimposed resin reinforced roving bundles 6 result in the necessary distance 8 between the two outer plates or sheets 1 and 2. Since the rib elements 20, as shown in FIG. 3, are arranged in a crosswise or intersecting manner, a net structure is obtained so that reinforcement in four directions of stress is achieved. Thus, the outer sheets 1 and 2 provide reinforcements in the two main directions (longitudinal and transverse) while the rib elements with their roving bundles provide reinforcements in two torsional stress directions. It will be appreciated that it is feasible to arrange still further rib elements in still different directions so as to increase the reinforcement of the ultimate structure.

Figure 4:
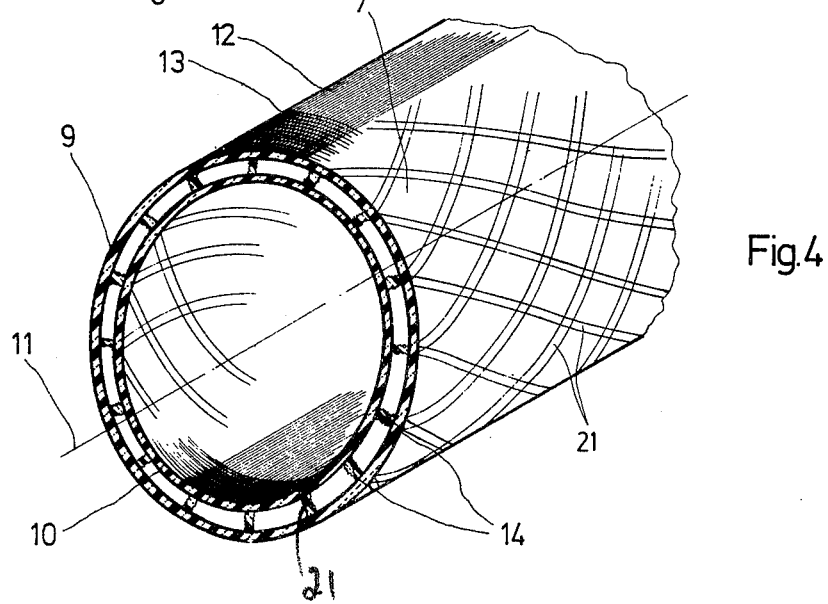
FIG. 4 shows a further embodiment of the invention in which the reinforced laminate is in tube formation to form a hollow body.

Turning now to the embodiment of FIG. 4, it will be noted that the reinforced laminate is formed into a tube or hollow body which has the shape of a cylinder. The cylinder is thus composed of the outer sheet 9 and the correspondingly formed inner sheet 10. The direction or orientation of the reinforcing fibers 12 and 13, respectively, is parallel to the cylinder axis 11 and also in circumferential direction as clearly seen in the top plate 9 of FIG. 4. As in the embodiment of FIG. 2, the fibers may be provided in separate mats, the fibers of one mat then extending at right angles to the fibers of the other mat. The rib elements of the supporting core are arranged between the sheets 9 and 10 and are indicated by reference numeral 21. As in the previous embodiment, these rib elements 21 are formed from roving bundles impregnated with synthetic resin, the roving bundles being designated by reference numeral 14. The netlike structure of these rib elements 21 can be observed in FIG. 4 and also in actual embodiments dependent on the colorization of the material. The outer and inner plates 9 and 10 are oftentimes made of light permeable material so that the roving bundles 14 can be observed, as seen in FIG. 4. It will be noted that the roving bundles 14 of the rib elements 21 are oriented in the direction of torsion stress of such a cylinder.

It should also be appreciated that the inventive construction can be used as jacket for hollow bodies and that both the outer sheets and/or the rib elements of the supporting core can be produced accordingly to a winding procedure, such as disclosed in U.S. Pat. No. 2,843,153 and British Pat. No. 619,674.

The inventive structure, be it in plane or tubular form, has many advantages. The two primary advantages are the light weight and the superior strength characteristics. Moreover, the production of the laminates is exceedingly simple. Generally, the outer plates or sheets may be produced in conventional manner from fiber mattings which are resin impregnated. The rovings are also impregnated with resin in conventional manner. Either by way of the manual lay-up technique or by way of a filament winding process, the rovings are superimposed to form the necessary thickness or height for the ultimate ribs. The roving bundles thus formed are united and held together by impregnation with synthetic resin in conventional manner. After the rib elements and the outer sheets have been produced, the outer sheets and the rib elements are placed in the proper position and subjected to pressure and heat, for example, in a pressure vessel to form the final structure, the resin causing the adhesion between the elements. As stated, in the production of hollow bodies, such as shown in FIG. 4, the outer sheets and the roving bundles may be produced by way of a winding procedure.

What is claimed is:

1. A laminate comprising first and second continuous spaced sheets of fiber-reinforced synthetic resin, with the reinforcing fibers in each sheet oriented to provide reinforcement in two directions of stress, said reinforcing fibers of each of said first and second sheets being arranged in two superimposed fiber layers, the fibers of one of the layers extending perpendicularly to the fibers of the other layer, and a supporting core sandwiched between said first and second sheets, wherein said supporting core consists of intersecting rib elements with unfilled spaces between one another extending in directions different from the directions in which the reinforcing fibers of said first and second sheets are oriented, said rib elements being composed of roving bundles impregnated with synthetic resin and wherein the intersecting rib elements with their synthetic resin impregnated roving bundles extend diagonally to the fibers of said first and second sheets.

2. A laminate as claimed in claim 1, wherein the laminate is in the shape of a hollow body, one of the reinforcing fiber layers of said first and second sheets extending in the longitudinal direction of the axis of the hollow body and the other layer perpendicular thereto.

3. A laminate as claimed in claim 1, wherein each of said rib elements comprises a plurality of superimposed roving bundles impregnated with synthetic resin.

4. A laminate as claimed in claim 1, wherein said rib elements extend in intersecting manner to form a net structure.

* * * * *